(12) United States Patent
Takeda

(10) Patent No.: US 6,914,996 B2
(45) Date of Patent: Jul. 5, 2005

(54) PORTABLE TELEPHONE ATTACHMENT FOR PERSON HARD OF HEARING

(75) Inventor: Takeshi Takeda, Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 238 days.

(21) Appl. No.: 10/181,899
(22) PCT Filed: Nov. 16, 2001
(86) PCT No.: PCT/JP01/10011
§ 371 (c)(1), (2), (4) Date: Jul. 24, 2002
(87) PCT Pub. No.: WO02/43358
PCT Pub. Date: May 30, 2002

(65) Prior Publication Data
US 2004/0013279 A1 Jan. 22, 2004

(30) Foreign Application Priority Data
Nov. 24, 2000 (JP) ........................................ 2000-357036

(51) Int. Cl.[7] ............................................... H04R 25/00
(52) U.S. Cl. ...................... 381/380; 381/374; 455/90.3
(58) Field of Search ................................ 381/374, 380, 381/381, 326; 455/90.3, 550.1, 575.6; 379/443, 444, 447

(56) References Cited

U.S. PATENT DOCUMENTS

| 4,596,899 A | * | 6/1986 | Wojcik et al. | ............... | 381/321 |
| 4,823,384 A | * | 4/1989 | Lindsay | ....................... | 379/441 |
| 4,864,611 A | * | 9/1989 | Helmuth | ..................... | 381/161 |

FOREIGN PATENT DOCUMENTS

JP 08-102780 * 4/1996 ............ H04M/1/21

* cited by examiner

Primary Examiner—Curtis Kuntz
Assistant Examiner—Brian Ensey
(74) Attorney, Agent, or Firm—Browdy and Neimark, P.L.L.C.

(57) ABSTRACT

The purpose is to provide a cellular phone attachment for a hearing-impaired person. The attachment is adapted to be used as a hearing aid for catching a voice sound issued from the conversation partners when the hearing-impaired person makes conversation to his or her partners through the cellular phone. The attachment is constructed of: a microphone disposed closely adjacent to a receiver opening of the cellular phone in use; a bone conduction speaker adapted to be brought into contact with a portion of the person's head; a main body portion provided with an amplifier and a battery; and, a fitting means for mounting each of the microphone, the bone conduction speaker and the main body portion on the cellular phone.

4 Claims, 3 Drawing Sheets

PORTABLE TELEPHONE ATTACHMENT FOR PERSON HARD OF HEARING

FIELD OF THE INVENTION

The present invention relates to a cellular phone attachment for a hearing-impaired person, and more particularly to such a cellular phone attachment adapted to be used by the hearing-impaired person as his or her hearing aid in communication, wherein the cellular phone attachment is compact in size and employs a high-performance bone conduction speaker.

BACKGROUND OF THE INVENTION

In recent years, various types of accessories and/or attachments dedicated to cellular phones in use have been provided in the art as the cellular phones are coming into increasingly wide spread use. These accessories and/or attachments range from a practical unit, which permits a vehicle's driver to perform a so-called "hand-free talking" over the cellular phone, to a fashionable accessory other than such a practical unit.

The conventional cellular phone is disadvantageous in that: it is difficult for a user who is impaired in his or her hearing ability to catch a voice sound issued from his or her conversation partners. Further, even for a person who is normal in hearing ability, it is often difficult to catch a voice sound issued from his or her conversation partners when the person uses the conventional cellular phone in a noisy environment. However, there is still not proposed any cellular phone attachment capable of serving as a hearing aid under such circumstances in the art.

Consequently, it is an object of the present invention to provide a cellular phone attachment for a hearing-impaired person, wherein the cellular phone attachment serves as a hearing aid which enables the person to clearly catch a voice sound issued from his or her conversation partners, without fail.

SUMMARY OF THE INVENTION

A cellular phone attachment of the present invention for a hearing-impaired person comprises a microphone disposed closely adjacent to a receiver opening of a cellular phone in use; a bone conduction speaker adapted to be brought into contact with a portion of a user's head; a main body portion provided with an amplifier and a battery; and, a fitting means for mounting each of the microphone, the bone conduction speaker and the main body portion on the cellular phone.

BEST MODE FOR CARRYING OUT THE INVENTION

Figure 1:
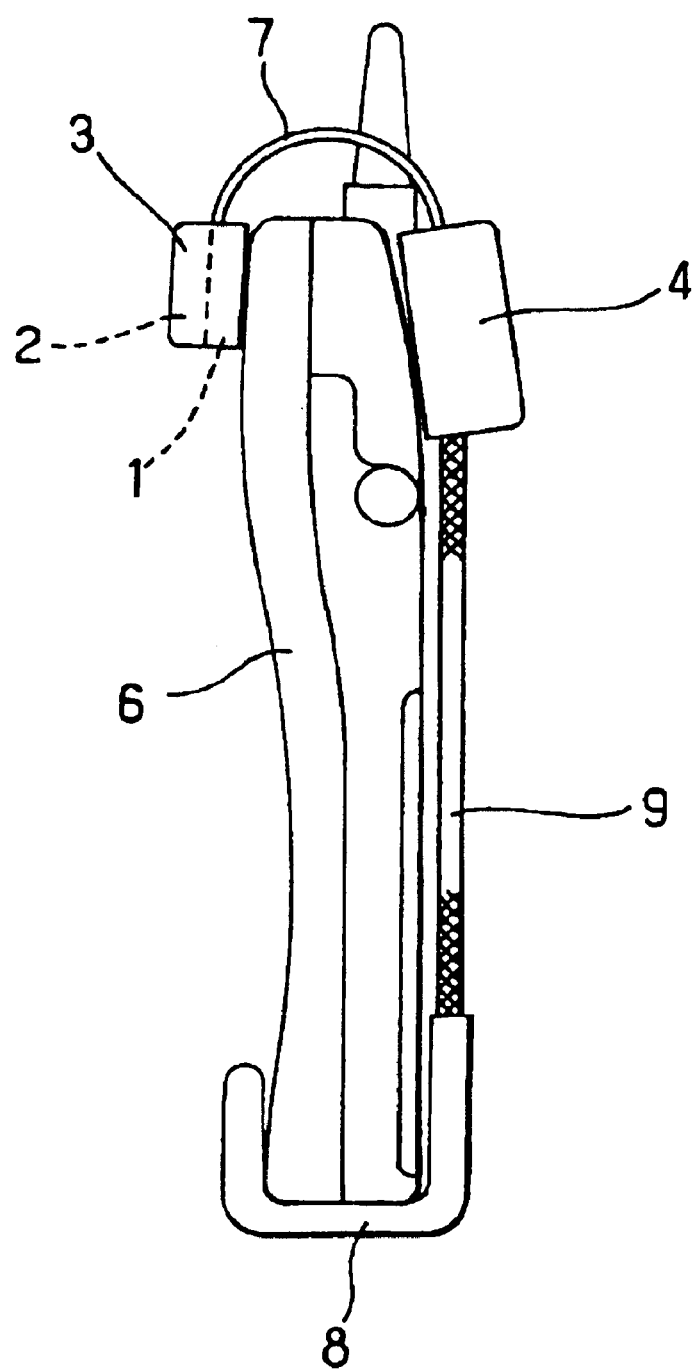
FIG. 1 is a side view of an embodiment of the cellular phone attachment for the hearing-impaired person according to the present invention.
Figure 2:
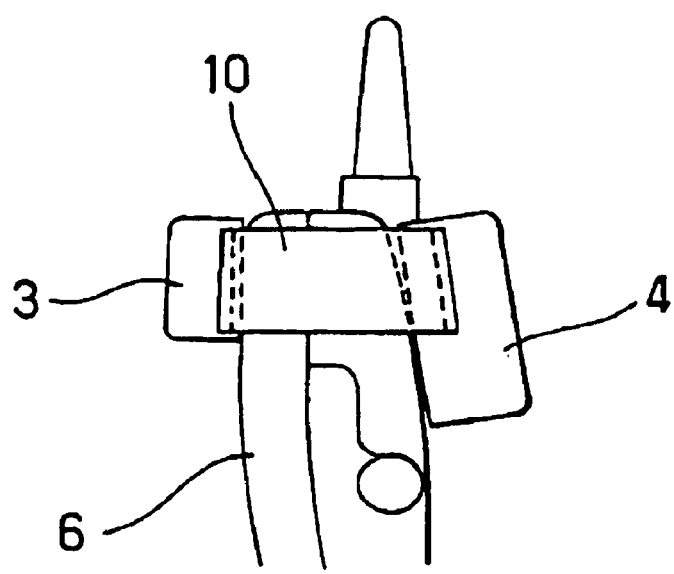
FIG. 2 is a side view of another embodiment of the cellular phone attachment for the hearing-impaired person according to the present invention.
Figure 3:
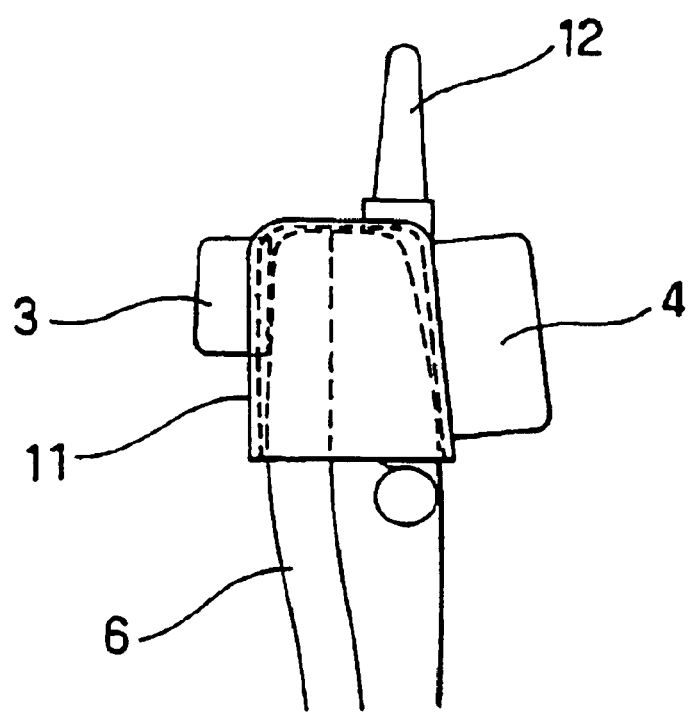
FIG. 3 is a side view of further another embodiment of the cellular phone attachment for the hearing-impaired person according to the present invention.

With reference to the accompanying drawings, embodiments of the present invention will be described. FIGS. 1 to 3 show side views of these embodiments of the cellular phone attachment for the hearing-impaired person according to the present invention.

The cellular phone attachment of the present invention for the hearing-impaired person comprises a speaker unit 3 having a construction in which both a microphone 1 and a bone conduction speaker 2 are contained in a single casing, wherein the microphone 1 is disposed closely adjacent to a receiver opening of a cellular phone 6 in use, and the bone conduction speaker 2 is adapted to be brought into contact with a portion of a user's head; a main body unit 4, incorporated in which are both an amplifier and a battery; and, a fitting means for mounting each of the speaker unit 3 and the main body unit 4 on the cellular phone 6. Incidentally, it is not necessarily required to have the microphone 1 integrally formed with the bone conduction speaker 2. In other words, in contrast with the speaker unit 3, the microphone 1 and the bone conduction speaker 2 may be separated in construction so as to form independent units.

Needless to say, the microphone 1 of the cellular phone attachment forms an input means. The input means collects a voice sound issued from the conversation partners through a receiver opening of the cellular phone 6, and then issues the thus collected voice sound to the amplifier of the main body unit 4 of the attachment. In order to improve the cellular phone 6 in efficiency of its sound-collecting properties, preferably an annular member made of plastics rubber or any other suitable material for improving the receiver opening of the cellular phone 6 in its fitting properties is employed. The annular member encircles the receiver opening of the cellular phone 6 in its contact area through which the microphone 1 of the attachment is brought into close contact with the receiver opening of the cellular phone 6.

On the other hand, the bone conduction speaker 2 is a means for producing an acoustic vibration corresponding to the voice sound issued from the conversation partners, wherein the voice sound has been collected using the microphone 1 and amplified through the amplifier of the main body unit 4 of the attachment. In use, the bone conduction speaker 2 is disposed adjacent to a user's head in a manner such that the bone conduction speaker 2 is brought into contact with a portion of the user's head.

Incorporated in the main body unit 4 of the attachment are the amplifier and the battery (which is, in general, a rechargeable lithium battery) for energizing the amplifier. In the case of the rechargeable battery, a pair of recharging terminals of the battery are disposed outside the main body unit 4. Further provided in the main body unit 4 is a power switch in a typical construction of the attachment.

There are various types of the fitting means in the art. One of the fitting means is shown in FIG. 1 which one is of a snap-on type and constructed of: an upper hook portion 7 provided with opposite end portions each of which carries each of the speaker unit 3 and the main body unit 4 thereon; a lower hook portion 8; and, a telescopic portion 9 for connecting the upper hook portion 7 with the lower hook portion 8, wherein the telescopic portion 9 has at least a part thereof be extensible and retractable. Mounted in the upper hook portion 7 of the fitting means in an insertion manner is a cord for electrically connecting the main body unit 4 with each of the microphone 1 and the bone conduction speaker 2.

In this case of the fitting means, in use, after the upper hook portion 7 is snapped on an upper portion of the cellular phone 6, the lower hook portion 8 is then pulled downward to stretch the telescopic portion 9. Under such circumstances, the lower hood portion 8 is snapped on a lower portion of the cellular phone 6 so that the attachment is fixedly amounted on the cellular phone 6 by using a resilient force exerted by the telescopic portion 9. It is also possible to have the lower hood portion 8 snapped on the lower portion of the cellular phone 6 before the upper hook portion 7 is snapped on the upper portion of the cellular phone 6. In either case, the microphone 1 of the attachment is brought into close contact with the receiver opening of the cellular phone 6 in use (this is true in any of the following embodiments).

The fitting means shown in FIG. 2 functions to connect the speaker unit 3 with the main body unit 4 through a telescopic band 10 of a snap-on type which runs round an upper portion of the cellular phone 6. In this embodiment, in attaching the attachment to the cellular phone 6, the telescopic band 10 is stretched and then snapped on the upper portion of the cellular phone 6. The cord for electrically connecting the main body unit 4 with each of the microphone 1 and the bone conduction speaker 2 is mounted in the telescopic band 10 in an insertion manner.

On the other hand the fitting means shown in FIG. 3 is constructed of a cap 11, which is of a snap-on type adapted to be mounted on the upper portion of the cellular phone 6 in a manner such that the cap 11 entirely covers the upper portion of the cellular phone 6. Fixedly mounted on such a cap 11 are the speaker unit 3 and the main body unit 4. Typically, the cap 11 is made of plastics through a plastic-molding process, assumes a shape substantially corresponding to the shape of the upper portion of the cellular phone 6 and is provided with a through-hole through which an antenna 12 passes to extend outward.

In any of the above embodiments, when the attachment is attached to the cellular phone 6 to enable the person to make conversation to the conversation partners and the conversation starts, the bone conduction speaker 2 vibrates as the voice sound issued from the conversation partners are outputted to the main body unit 4 through the microphone 1 of the speaker unit 3.

By bringing the bone conduction speaker unit 3 into contact with a portion of his or her head, it impossible for the person to recognize the voice sound of the conversation partners through stimulation of his auditory nerves via his skull with the use of vibrations transmitted from the bone conduction speaker 2.

INDUSTRIAL APPLICABILITY

The present invention has the construction described above. Consequently, it is possible to mount the attachment of the present invention on any one of commercially available cellular phones in an easy manner. Further, it is also possible even for any person suffering from impairment in hearing ability to clearly catch the voice sound of the conversation partners through the cellular phone.

Still further, even in a noisy environment, it is possible for both the hearing-impaired person and a person normal in hearing ability to clearly catch the voice sound of the conversation partners. Consequently, the present invention is remarkably useful in industry.

What is claimed is:

1. A cellular phone attachment for a hearing-impaired person comprises: a microphone disposed closely adjacent to a receiver opening of a cellular phone in use; a bone conduction speaker adapted to be brought into contact with a portion of a user's head; a main body portion provided with an amplifier and a battery; and, a fitting means for mounting each of said microphone, said bone conduction speaker and said main body portion on said cellular phone wherein said fitting means has at least a part thereof constructed of an extensible and retractable portion, and is of a snap-on type provided with opposite end portions, wherein an upper one of said opposite end portions is snapped on an upper surface of said cellular phone, and a lower one of said opposite end portions is snapped on a lower surface of said cellular phone.

2. The cellular phone attachment for the hearing impaired person as set forth in claim 1, wherein both said microphone and said bone conduction speaker are received in a single casing.

3. The cellular phone attachment as set forth in claim 1 or 2 for the hearing-impaired person wherein said extensible and retractable portion is engaged between said opposite end portions.

4. The cellular phone attachment as set forth in claim 1 or 2 for the hearing-impaired person wherein said battery is rechargeable through terminals disposed outside the main body.

* * * * *